C. L. SMITH.
Improvement in the Mode of Attaching Pulleys and Wheels to Shafting.
No. 132,029.
Patented Oct. 8, 1872.
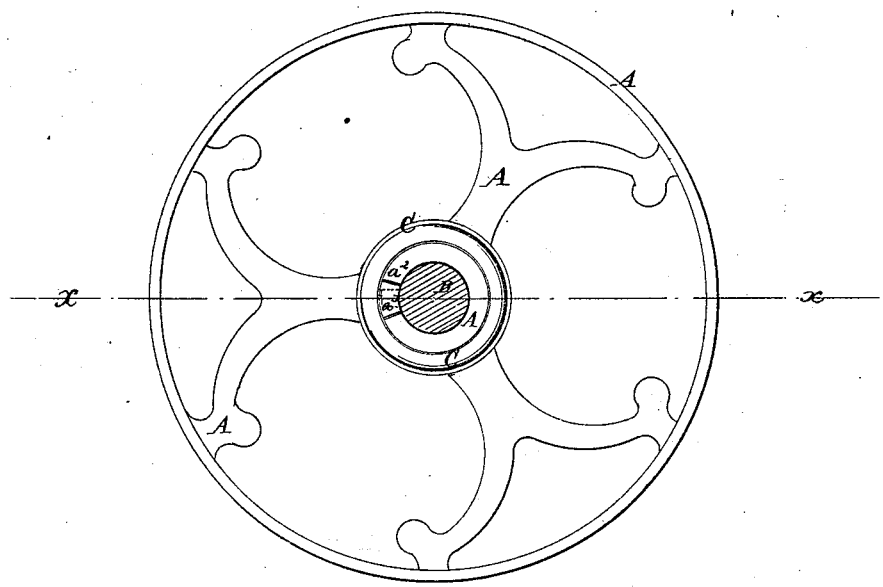
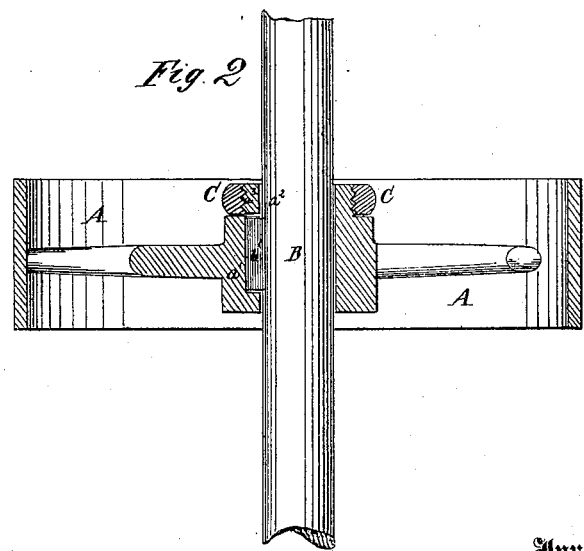
Witnesses:
N. W. Almqvist
C. Sedgwick
Inventor:
C. L. Smith
PER
Munn & Co
Attorneys.

UNITED STATES PATENT OFFICE.

CHARLES L. SMITH, OF RAHWAY, NEW JERSEY.

IMPROVEMENT IN THE MODES OF ATTACHING PULLEYS AND WHEELS TO SHAFTING.

Specification forming part of Letters Patent No. 132,029, dated October 8, 1872.

*To all whom it may concern:*

Be it known that I, CHARLES L. SMITH, of Rahway, in the county of Union and State of New Jersey, have invented a new and useful Improvement in Attaching Wheels and Pulleys to Shafting, of which the following is a specification:

Figure 1 is a side view of a pulley to which my improvement has been applied, the shaft being shown in cross-section. Fig. 2 is a detail section of the pulley, the shaft being shown in side view.

Similar letters of reference indicate corresponding parts.

My invention has for its object to furnish an improved device for attaching pulleys and wheels to shafts securely, and at the same time detachably, and which shall be simple in construction and easily manipulated; and it consists in the groove, tongue, dovetailed notch, dovetailed piece, and band or nut, arranged in connection with the pulley and shaft, as hereinafter more fully described.

A represents a pulley, in the hub of which is formed a groove, $a^1$, which does not extend the whole length of said hub, and which is designed to receive a key, $b'$, rigidly attached to the shaft B, upon which the pulley A is placed. In the end of the hub of the pulley A, at the end of the groove $a^1$, is formed a dovetailed notch, $a^2$, into which is fitted a dovetailed piece, $a^3$. Upon the outer surface of the end of the pulley-hub and of the piece $a^3$ is formed a screw-thread, into which fits the screw-thread of the nut or band C. By this construction the dovetailed piece $a^3$ prevents the tongue $b'$ from coming out of the groove $a^1$, and the band or nut C prevents the piece $a^3$ from coming out of the notch $a^2$, so that the pulley is rigidly and at the same time detachably connected with its shaft.

Having thus described my invention, I claim as new and desire to secure by Letters Patent—

The groove $a^1$, tongue $b'$, dovetailed notch $a^2$, dovetailed piece $a^3$, and nut or band C, arranged in connection with the pulley or wheel A and shaft B, substantially as herein shown and described, and for the purpose set forth.

CHARLES LEVIN SMITH.

Witnesses:
W. M. H. SMITH,
SHEPPARD W. SMITH.